Dec. 7, 1965     P. T. SNYDER ET AL     3,221,681
PLANTER FOR POTTED PLANTS
Filed Jan. 2, 1964     2 Sheets-Sheet 1
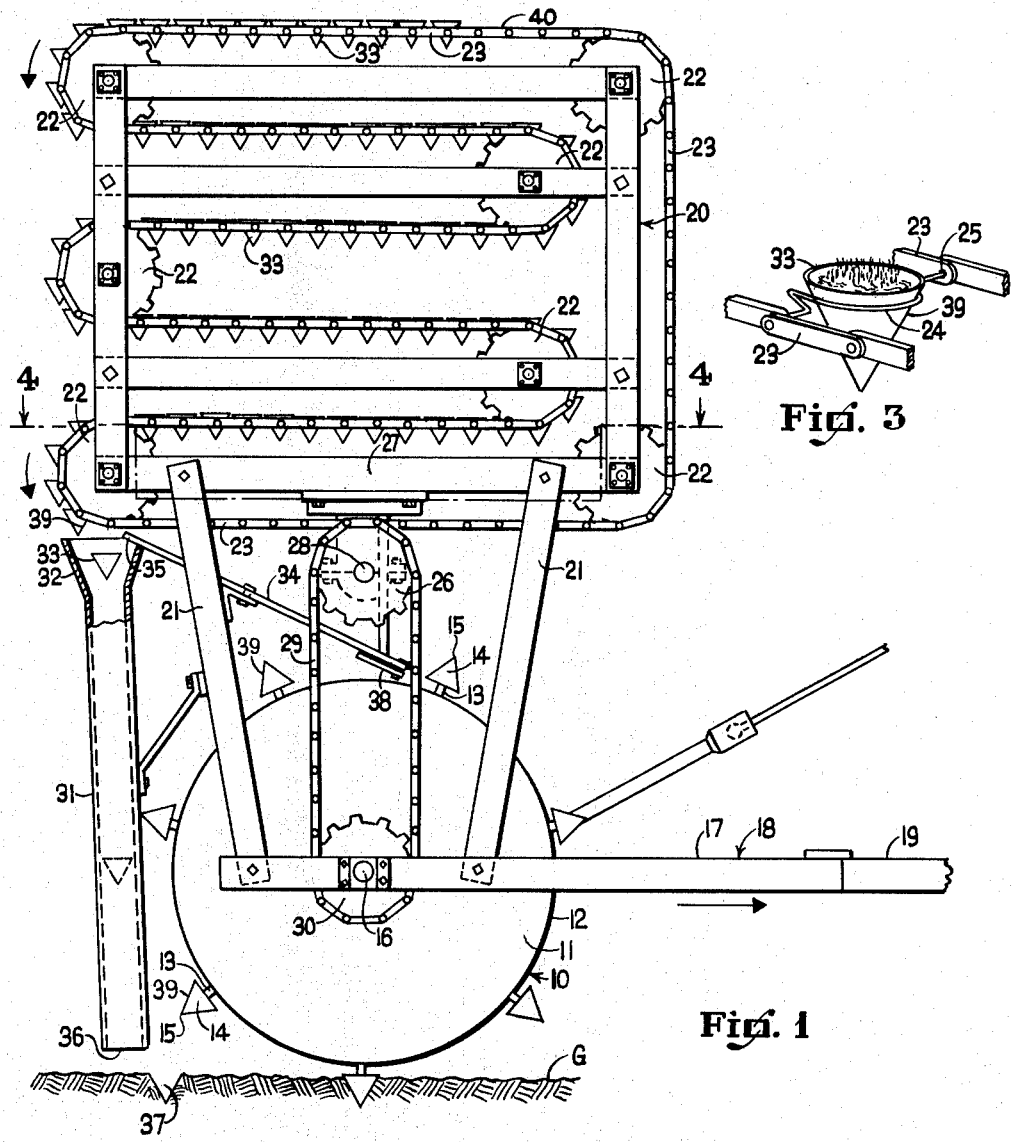
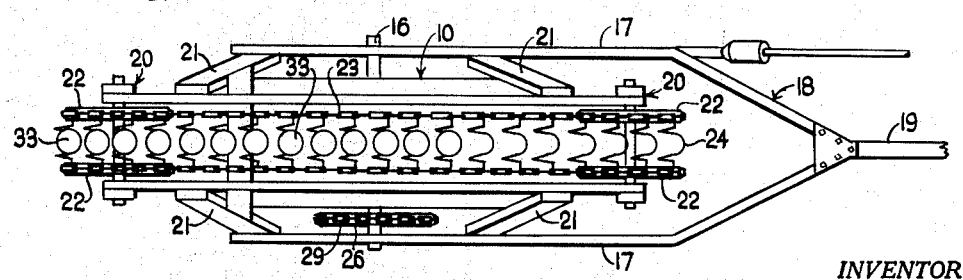
INVENTORS
Phillip T. Snyder.
Fred Becker.

Dec. 7, 1965 P. T. SNYDER ET AL 3,221,681
PLANTER FOR POTTED PLANTS
Filed Jan. 2, 1964 2 Sheets-Sheet 2

INVENTORS
Phillip T. Snyder.
Fred Becker.

United States Patent Office 3,221,681
Patented Dec. 7, 1965

3,221,681
PLANTER FOR POTTED PLANTS
Phillip T. Snyder, 8003 Oak Ave., and Fred Becker, 8248 Sunrise Ave., both of Citrus Heights, Calif.
Filed Jan. 2, 1964, Ser. No. 335,051
7 Claims. (Cl. 111—3)

This invention relates to farm machinery and, more particularly, to that piece of farm machinery known as a planter and, still more particularly, to a planter that has been specially designed for the planting of small plants such as tomato plants or the like, though it can also be used for the planting of crops by the dropping of seeds, as will be hereinafter described.

Planters, which are strictly an American invention, have been playing an important part in farming in this country since 1825, when the first machine for planting cotton was developed. Since that time considerable progress has been made in this art although no attempt has been made or resulted in the production of a machine that will automatically plant anything that can be grown by the planting of plants.

The grower of tomatoes, for example, has long been handicapped by the lack of a suitable planter for his crops as have others whose living depends upon the mass production of crops initiated by the insertion of single small plants into an opening in the ground. The ordinary planter which has to date been developed primarily for the planting of corn and cotton seeds is of little, if any, value to the tomato farmer and the like.

It is, therefore, the principal object of this invention to provide an automatic planter that is specially adapted to the planting of small plants into openings made by the same machine as it travels along predetermined rows in the field or garden.

Another object of this invention is to provide an automatic planter that can be towed behind any tractor or the like.

Another object of this invention is to provide an automatic planter that will first make a recess in the ground into which it automatically sets the desired plants.

Another object of this invention is to provide an automatic planter that will plant small plants or seeds with equal ease.

Another object of this invention is to provide an automatic planter constructed entirely of easily obtainable parts that can, if necessary, be duplicated in nearly any garage or machine shop without the use of special machinery and/or skills of a workman.

Another object of this invention is to provide an automatic planter that can be made to plant any number of rows by one operator.

Another object of this invention is to provide an automatic planter that can be automatically loaded with the plants directly from the trucks that deliver the plants to the field in which they are to be planted.

Still another object of this invention is to provide an automatic planter that will minimize both the need to irrigate the new plants as well as the need for weeding the same since they are each kept in some of their original soil in cone-shaped cups which are automatically placed into the ground in a manner that will prevent their freezing and/or wilting.

Reference is to be had to the accompanying drawings forming a part of this specification, in which similar figures and letters of reference indicate corresponding parts in all the views.

FIGURE 1 is a side view of this invention.

FIGURE 2 is a top view of this invention.

FIGURE 3 is a pictorial view of one detail of this invention.

Figure 4:
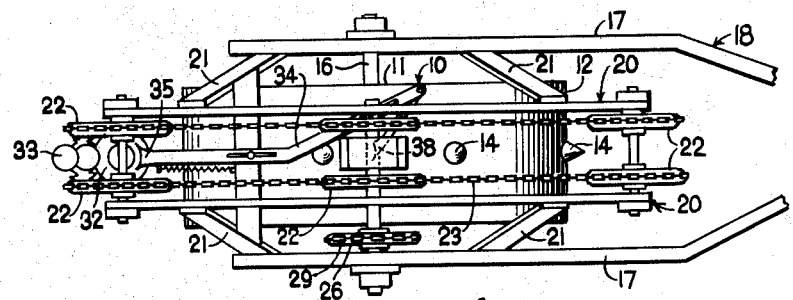
FIGURE 4 is a horizontal sectional view of this invention taken along line 4—4 of FIGURE 1 as viewed in the direction indicated by the arrows.
Figure 5:
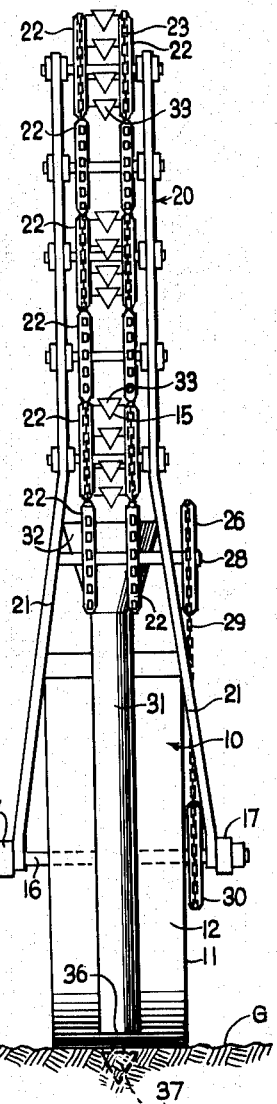
FIGURE 5 is a back view of this invention.

Referring now to the drawings in detail, it will be seen that the embodiment of the invention which has been illustrated comprises a hollow steel wheel 10 having side plates 11, and a peripheral member 12 from which outwardly projects a plurality of thirty-degrees swivels 13 that are in equal radial spaced relation to each other and to the outer end of each one which is secured a cone-shaped member 14 having an apex 15 that punctures the earth on which this automatic planter rests, as will be more fully described later on in this specification. The aforesaid wheel 10 is supported by a horizontally disposed axle 16 that has each outer end rotatably held by one side 17 of the horizontally disposed Y-shaped towing member 18 that has its stem 19 suitably connected to any tractor or the like that may be employed to tow this automatic planter about a field.

A rectangular framework 20 is supported by the upper end of four uprights 21 that have their lower end bolted or otherwise secured to the aforesaid side members 17.

The aforesaid framework 20 rotatably supports a plurality of free turning sprockets 22 in pairs, the sprockets of each pair being in horizontal spaced relation to one another, thereby providing a set of sprockets, seven in number, in the present embodiment of the invention, on one side of the framework and an alike number on the other side of the same framework. Each set of sprockets is encompassed in part by an endless chain 23. A plurality of U-shaped hangers 24 having ends 25 that are suitably secured to one of the aforesaid endless chains 23 in a manner that permits each U-shaped hanger to freely swing between each chain is shown in FIGURE 3 of the drawings.

Examination of FIGURE 1 of the drawings clearly shows that a drive sprocket 26 is suitably secured to the underside of one of the two parallel and spaced horizontal supporting members 27 of the aforesaid framework 20 in a manner that will permit alike sprockets (not visible in the drawings), that are mounted on the same shaft 28, to have the uppermost portion of their periphery engage the underside of the aforesaid endless chains 23 when the shaft 28 is rotated by the drive chain 29 that encompasses, not only part of the aforesaid drive sprocket 26, but also the power sprocket 30, that is secured to the aforesaid horizontally disposed axle 16, which supports the hollow steel wheel 10. A plastic tube 31, having a funnel-shaped open upper end 32, is so secured to two of the aforesaid uprights 21 as to hold the funneled shape upper end 32 directly under that one of the aforesaid sprockets 22 that is located in the lower left-hand side of the aforesaid framework 20, thereby being adapted to receive the paper cone-shaped cups 33 in which plants have been manually placed when the U-shaped hangers 24 are in the desired horizontal position, as will be described later on in this specification. An angularly disposed bar 34 is suitably secured to this invention in a way that will cause the upper end 35 of the bar 34, which I call a kicker, to dislodge each one of the paper cone-shaped cups 33 from the U-shaped hangers 24, when the cups are directly over the center of the aforesaid funneled shape upper end 32 of the plastic tube 31, through which they, the cone-shaped paper cups 33, and their plants will drop, and on out the open bottom 36 of the tube, on into the cone-shaped depression 37, that has been made into the ground G, over which this invention is being towed as it sows the plants. The aforesaid kicker 34 is obviously activated by having the lower end 38 ride upward on the sloping side 39 of each one of the aforesaid cone-shaped members 14 of the hollow steel wheel 10, as the wheel rotates and the cone-shaped members 14 reach the top of the wheel.

The construction of this invention of an automatic planter has now been described in detail, and it only remains to briefly state the way in which the device is used, since the drawings are self-explanatory, in both construction and usage, the latter being understood by examination of FIGURE 1, where it can be seen that by towing this automatic planter behind a tractor or truck, one has only to place the plants in their paper cone-shaped cups into the U-shaped hangers at 40, FIGURE 1, and they will be carried down to the top of the funnel-shaped upper end 32 of the plastic tube 31, where they will be kicked from the aforesaid U-shaped holders 24 and will then drop down through the plastic tube 31 into the cone-shaped depression 37 in the ground G, as has already been described.

Some changes may be made in the arrangement of parts and construction of this automatic planter that we have invented, and substitutions may be made without departing from the real spirit and purpose of our invention, as it is our intention to be fully covered by our claims, any modified forms of structure, or the use of any mechanical equivalents of the said structure will be considered within the scope of the said claims.

What we now claim as our invention, and what we now desire to secure by Letters Patent is:

1. An automatic planter of the character described, comprising a hollow wheel having structure thereon adapted to make a plurality of depressions in the ground over which it is run in longitudinal and equal spaced relation to each other, the said hollow wheel being rotatably supported by a Y-shaped member that is towed behind a vehicle, and the said Y-shaped member supporting a framework above the said hollow wheel, the said framework embodying a plurality of free-turning sprockets therein, on which rests a pair of endless chains in equal and parallel spaced relation to one another, and mechanism activating the said endless chains in the same direction at the same speed when the said automatic planter is given linear motion, the said endless chains swingably supporting a plurality of equally spaced U-shaped hangers therebetween, in which are placed paper cups having plants that it is desired to plant in the ground, and structure adapted to guide the said paper cups into the depressions in the ground when they have been dislodged from the said U-shaped hangers by automatic mechanism as the said automatic planter is towed along the said ground.

2. An automatic planter of the character described, comprising a hollow steel wheel having a plurality of cone-shaped members secured to the periphery thereof in equal radial spaced relation to each other and adapted to make a plurality of cone-shaped depressions in the ground over which it is run in longitudinal and equal spaced relation to each other, the said hollow steel wheel being rotatably supported by a Y-shaped member that is towed behind a vehicle, and the said Y-shaped member supporting a framework above the said hollow steel wheel, the said framework embodying a plurality of free-turning sprockets therein, on which rests a pair of endless chains in equal and parallel spaced relation to one another, and mechanism activating the said endless chains in the same direction at the same speed when the said automatic planter is given linear motion, the said endless chains swingably supporting a plurality of equally spaced U-shaped hangers therebetween, in which are placed paper cups having plants that it is desired to plant in the ground, means operated by the cone-shaped members to dislodge each paper cup when it is in a predetermined position with respect to said framework, and structure adapted to guide the said paper cups into the cone-shaped depressions in the ground when they have been dislodged from the said U-shaped hangers by said means as the said automatic planter is towed along the said ground.

3. An automatic planter of the character described, comprising a hollow steel wheel having a plurality of cone-shaped members secured to the periphery thereof in equal radial spaced relation to each other and adapted to make a plurality of cone-shaped depressions in the ground over which it is run in longitudinal and equal spaced relation to each other, the said hollow steel wheel being rotatably supported by a Y-shaped member that is towed behind a vehicle, and the said Y-shaped member supporting a rectangular framework above the said hollow steel wheel, the said rectangular framework embodying a plurality of free-turning sprockets therein, on which rests a pair of endless chains in equal and parallel spaced relation to one another, and mechanism activating the said endless chains in the same direction at the same speed when the said automatic planter is given linear motion, the said endless chains swingably supporting a plurality of equally spaced U-shaped hangers therebetween, in which are placed paper cups having plants that it is desired to plant in the ground, means operated by the cone-shaped members to dislodge each paper cup when it is in a predetermined position with respect to said framework, and structure adapted to guide the said paper cups into the cone-shaped depressions in the ground when they have been dislodged from the said U-shaped hangers by said means as the said automatic planter is towed along the said ground.

4. An automatic planter of the character described, comprising a hollow steel wheel having a plurality of cone-shaped members secured to the periphery thereof in equal radial spaced relation to each other and adapted to make a plurality of cone-shaped depressions in the ground over which it is run in longitudinal and equal spaced relation to each other, the said hollow steel wheel being rotatably supported by a Y-shaped member that is towed behind a vehicle, and the said Y-shaped member supporting a rectangular framework above the said hollow steel wheel, the said rectangular framework embodying a plurality of free-turning sprockets therein, the said sprockets being mounted in pairs, on which rests a pair of endless chains in equal and parallel spaced relation to one another, and mechanism activating the said endless chains in the same direction at the same speed when the said automatic planter is given linear motion, the said endless chains swingably supporting a plurality of equally spaced U-shaped hangers therebetween, in which are placed paper cups having plants that it is desired to plant in the ground, means operated by the cone-shaped members to dislodge each paper cup when it is in a predetermined position with respect to said framework, and structure adapted to guide the said paper cups into the cone-shaped depressions in the ground when they have been dislodged from the said U-shaped hangers by said means as the said automatic planter is towed along the said ground.

5. An automatic planter of the character described, comprising a hollow steel wheel having a plurality of cone-shaped members secured to the periphery thereof in equal radial spaced relation to each other and adapted to make a plurality of cone-shaped depressions in the ground over which it is run in longitudinal and equal spaced relation to each other, the said hollow steel wheel being rotatably supported by a Y-shaped member that is towed behind a vehicle, and the said Y-shaped member supporting a rectangular framework above the said hollow steel wheel, the said rectangular framework embodying a plurality of free-turning sprockets therein, the said sprockets being mounted in pairs, on which rests a pair of endless chains in equal and parallel spaced relation to one another, and mechanism activating the said endless chains in the same direction at the same speed when the said automatic planter is given linear motion, the said endless chains swingably supporting a plurality of equally spaced U-shaped hangers therebetween, in which are placed paper cups having plants that it is desired to plant in the ground, means operated by the cone-shaped members to dislodge, each paper cup when it is in a predetermined position with respect to said framework, and a hollow tube having a funnel-shaped upper end adapted to receive and guide the said paper cups into the cone-shaped depressions in the ground when they have been dislodged from the said U-shaped hangers by said means as the said automatic planter is towed along the said ground.

6. An automatic planter of the character described, comprising a hollow steel wheel having a plurality of cone-shaped members secured to the periphery thereof in equal radial spaced relation to each other and adapted to make a plurality of cone-shaped depressions in the ground over which it is run in longitudinal and equal spaced relation to each other, the said hollow steel wheel being rotatably supported by a Y-shaped member that is towed behind a vehicle, and the said Y-shaped member supporting a rectangular framework above the said hollow steel wheel, the said rectangular framework embodying a plurality of free-turning sprockets therein, the said sprockets being mounted in pairs, on which rests a pair of endless chains in equal and parallel spaced relation to one another, and mechanism activating the said endless chains in the same direction at the same speed when the said automatic planter is given linear motion, the said endless chains swingably supporting a plurality of equally spaced U-shaped hangers therebetween, in which are placed paper cups having plants that it is desired to plant in the ground, an angularly disposed kicker having one end positioned to ride up over the sloping side of each one of said cone-shaped members while the other end dislodges corresponding paper cups, and a hollow tube having a funnel-shaped upper end adapted to receive and guide the said paper cups into the cone-shaped depressions in the ground.

7. An automatic planter of the character described, comprising a hollow steel wheel having a plurality of cone-shaped members secured to the periphery thereof in equal radial spaced relation to each other and adapted to make a plurality of cone-shaped depressions in the ground over which it is run in longitudinal and equal spaced relation to each other, the said hollow steel wheel being rotatably supported by a Y-shaped member that is towed behind a vehicle, and the said Y-shaped member supporting a rectangular framework above the said hollow steel wheel, the said rectangular framework embodying a plurality of free-turning sprockets therein, the said sprockets being mounted in pairs, on which rests a pair of endless chains in equal and parallel spaced relation to one another, and a vertically mounted endless chain having one sprocket secured to the axle of the said hollow steel wheel, on one side of the said hollow steel wheel, and another and upper sprocket being so mounted under the right lowermost horizontal member of the said rectangular framework as to cause the highest point of the last mentioned endless chain to engage the underside of one of the first mentioned endless chains, which are thereby activated at the same speed in the same direction when the said automatic planter is given linear motion, the said endless chains swingably supporting a plurality of equally spaced U-shaped hangers therebetween, in which are placed paper cups having plants that it is desired to plant in the ground, an angularly disposed kicker having one end positioned to ride up over the sloping side of each one of said cone-shaped members while the other end dislodges corresponding paper cups, and a hollow tube having a funnel-shaped upper end adapted to receive and guide the said paper cups into the cone-shaped depressions in the ground.

References Cited by the Examiner
FOREIGN PATENTS 637,608 5/1928 France.
809,260 7/1951 Germany.

ABRAHAM G. STONE, *Primary Examiner.*

WILLIAM A. SMITH III, *Examiner.*